(12) United States Patent
Spence

(10) Patent No.: US 8,622,478 B2
(45) Date of Patent: Jan. 7, 2014

(54) CHILD CAR SEAT WITH ADJUSTABLE HARNESS SYSTEM

(75) Inventor: Scott R. Spence, Atlanta, GA (US)

(73) Assignee: Graco Children's Products Inc., Atlanta, GA (US)

( * ) Notice: Subject to any disclaimer, the term of this patent is extended or adjusted under 35 U.S.C. 154(b) by 550 days.

(21) Appl. No.: 12/985,185

(22) Filed: Jan. 5, 2011

(65) Prior Publication Data

US 2012/0169098 A1 Jul. 5, 2012

(51) Int. Cl.
*A47D 15/00* (2006.01)
*B60N 2/24* (2006.01)

(52) U.S. Cl.
USPC .......................................... 297/484; 297/250.1

(58) Field of Classification Search
USPC .................. 297/484, 250.1, 256.1, 256.11
See application file for complete search history.

(56) References Cited

U.S. PATENT DOCUMENTS

| | | | |
|---|---|---|---|
| 3,910,634 A * | 10/1975 | Morris | 297/467 |
| 4,040,664 A * | 8/1977 | Tanaka et al. | 297/467 |
| 4,880,277 A * | 11/1989 | Takahashi et al. | 297/467 |
| 6,030,047 A * | 2/2000 | Kain | 297/484 |
| 6,189,970 B1 * | 2/2001 | Rosko | 297/250.1 |
| 6,623,074 B2 | 9/2003 | Asbach et al. | |
| 6,623,075 B2 * | 9/2003 | Baloga et al. | 297/250.1 |
| 7,188,897 B2 * | 3/2007 | Patrizi et al. | 297/250.1 |
| 7,547,065 B2 | 6/2009 | Barger | |
| 8,087,725 B2 * | 1/2012 | Hutchinson et al. | 297/250.1 |
| 2006/0103229 A1 * | 5/2006 | Fransen et al. | 297/484 |

* cited by examiner

*Primary Examiner* — David Dunn
*Assistant Examiner* — Richard Lowry
(74) *Attorney, Agent, or Firm* — Lempia Summerfield Katz LLC

(57) ABSTRACT

A child safety seat has a seat back with an upper end, a back side, and a front facing side. A harness system has a pair of safety straps each with a back portion on the back side and a shoulder strap portion on the front facing side. A router is on the back side and has a fixed upper guide, a fixed lower guide spaced below the upper guide, and a slider vertically movable therebetween. The back portions are routed from the respective shoulder strap portions through the slider, up to the upper guide, down to the lower guide, and back up to the slider. The slider is vertically adjustable between a raised position and a lowered position and determines the height of the shoulder strap portions.

19 Claims, 6 Drawing Sheets

CHILD CAR SEAT WITH ADJUSTABLE HARNESS SYSTEM

BACKGROUND

1. Field of the Disclosure

The present invention is generally directed to children's car seats, and more particularly to a safety seat harness system that can be height adjusted without having to undo and rethread the harness belts or straps.

2. Description of Related Art

A typical car seat or child safety seat has a seat shell and a harness system. The harness system typically has a pair of shoulder straps, a portion of which extend over the shoulders and downward over the chest of the seat occupant and latch to a buckle on a crotch strap. These types of seats are often configured to accommodate children of different size or to accommodate a growing child. A larger child requires a higher shoulder strap position than a smaller child seated at seat.

Conventional car seats of this type have employed a plurality of slots formed in the seat back of the shell. The shoulder straps can be threaded through a lower pair of the slots for a smaller child. As the child grows, the harness system must typically be undone from the seat shell and then rethreaded through a different, higher positioned pair of slots to adjust or raise the shoulder strap height.

Some manufacturers have tried to address the problem of having to undo and rethread a harness system on a car seat. One manufacturer has produced a seat with a harness that is routed over a rod on the back side of the seat back. In order to adjust the shoulder strap height, the rod is manually disengaged from the seat, moved to a different position, and then reengaged with the seat. Another manufacturer has produced a similar seat except that the harness routing rod is disengaged from the seat shell when the headrest is moved and moves as the headrest height position is adjusted. Yet another manufacturer has attached the harness straps to a trolley on the seat shell. Cords are employed to hold the trolley in place at a selected shoulder strap height. Elaborate or complex latching mechanisms are typically required to secure the above-mentioned types of height adjustment devices and solutions. Such solutions thus typically increase the cost and complexity of such car seats or safety seats.

SUMMARY

In one example according to the teachings of the present invention, a child safety seat has a seat back with an upper end, a back side, and a front facing side. The seat has a seat bottom with a forward end, a top side, and an underside. The seat has a harness system with a pair of safety straps, each with a shoulder strap portion extending forward and downward along the front facing side and an excess portion extending rearward from the shoulder strap portion behind the back side. The harness system also has an adjustment strap coupled to the excess portions and extending from the back side to the forward end. A router is on the back side and has an upper guide, a lower guide, and a slider movably positioned vertically between the upper and lower guides. The excess portions are routed from the shoulder strap portions through the slide, up to and over the upper guide, down to and under the lower guide, back up to and through the slider, and down to the adjustment strap. The height of the shoulder strap portions along the front facing side is adjustable and determined by a vertical position of the slider.

In one example, the child safety seat can have a splitter plate connected between the excess portions of the safety straps and the adjustment strap.

In one example, the adjustment strap can extend along the back side and along the underside of the seat bottom and can have a free end extending from an aperture in the forward end.

In one example, the height of the shoulder strap portions can be adjusted from a raised position downward by increasing tension on the adjustment strap.

In one example, the child safety seat can have a headrest coupled to the seat back near the upper end. The position of the headrest can be vertically adjustable in concert with the shoulder strap portions.

In one example, the child safety seat can have a headrest coupled to the seat back near the upper end. The shoulder strap portions can be threaded through part of the headrest and through the seat back whereby vertical movement of the slider can also move the shoulder strap portions and the headrest.

In one example, the upper and lower guides can be elongate bars fixed to the back side of the seat back.

In one example, the slider can be a plate and can have upper slots and lower slots.

In one example, the excess portions of the safety straps can each have an upper segment between the slider and the upper guide, an intermediate segment between the upper and lower guides, and a lower segment between the lower guide and the slider.

In one example, the adjustment strap can be releasably clamped and restrained from being adjusted, whereby pulling forward on the shoulder strap portions does not raise or lower the slider or the height of the shoulder strap portions.

In one example according to the teachings of the present invention, a child safety seat has a seat back with an upper end, a back side, a front facing side, and two vertically elongate pass through slots formed through the seat back. The child safety seat has a harness system with a pair of safety straps each with a back portion on the back side and a shoulder strap portion on the front facing side. The pair of safety straps is threaded through a respective one of the pass through slots. A router is on the back side of the seat back and has a fixed upper guide, a fixed lower guide spaced below the upper guide, and a slider vertically movable therebetween. The back portions can be routed from the respective shoulder strap portions through the slider, up to the upper guide, down to the lower guide, and back up to the slider. The slider is vertically adjustable between a raised position and a lowered position and determines the height of the shoulder strap portions.

In one example, the child safety seat can have an adjustment strap connected to the safety straps below the slider. The adjustment strap can have a free end that can be pulled to adjust the slider and shoulder strap portions from the raised position toward the lowered position.

In one example, the child safety seat can have a seat bottom with an underside and an adjustment strap can be routed beneath the underside with a free end protruding through an aperture in a forward end of the seat bottom. A clamping mechanism can be located at the aperture to releasably clamp the adjustment strap.

In one example, the child safety seat can have a headrest coupled to the seat back near the upper end. The shoulder strap portions can be threaded through part of the headrest whereby a height of the headrest is adjustable in concert with the slider and shoulder strap portions.

In one example, the child safety seat can have a biasing element coupled to the slider and bias the slider toward the raised position.

In one example, the child safety seat can have a seat bottom with an underside and a forward end and an adjustment strap coupled to the back portions of the safety straps. The adjustment strap can be routed beneath the underside and have a free end protruding from the forward end. A crotch strap can extend up from the seat bottom and the shoulder strap portions can be connectable to the crotch strap. A clamping mechanism can be located at the forward end to releasably clamp the adjustment strap.

In one example, a free end of an adjustment strap can be pulled outward from a forward free end of a seat bottom in order to adjust the height of the slider and shoulder strap portions from the raised position toward the lowered position.

In one example, a biasing element can be coupled to the slider or to a headrest and bias the slider and should strap portions toward the raised position, along with the headrest.

In one example, a device can be provided on the back side to create a tactile or audible feedback as the slider is moved between the raised and lowered positions.

BRIEF DESCRIPTION OF THE DRAWINGS

Objects, features, and advantages of the present invention will become apparent upon reading the following description in conjunction with the drawing figures, in which.

DETAILED DESCRIPTION OF THE DISCLOSURE

A child safety seat is disclosed and described herein that solves or improves upon one or more of the above-noted and/or other problems and disadvantages with prior known child safety seats. In one example, the child seat has a harness system guided by a router that can be manipulated to adjust the shoulder strap height of the harness. In one example, the harness height can be adjusted on the child seat without having to re-thread or undo the harness system from the seat. In one example, the harness system and router can be configured in such a way so that forward tension at the shoulder straps does not alter or affect the height position of the shoulder straps. In one example, the router is configured to distribute forward load or tension applied to the shoulder straps to different segments of the harness system and router in equal and opposite vertical directions so that the height position is not altered. Other objects, features, and advantages of the present invention will become apparent to those having ordinary skill in the art upon reading this disclosure.

Figure 1:
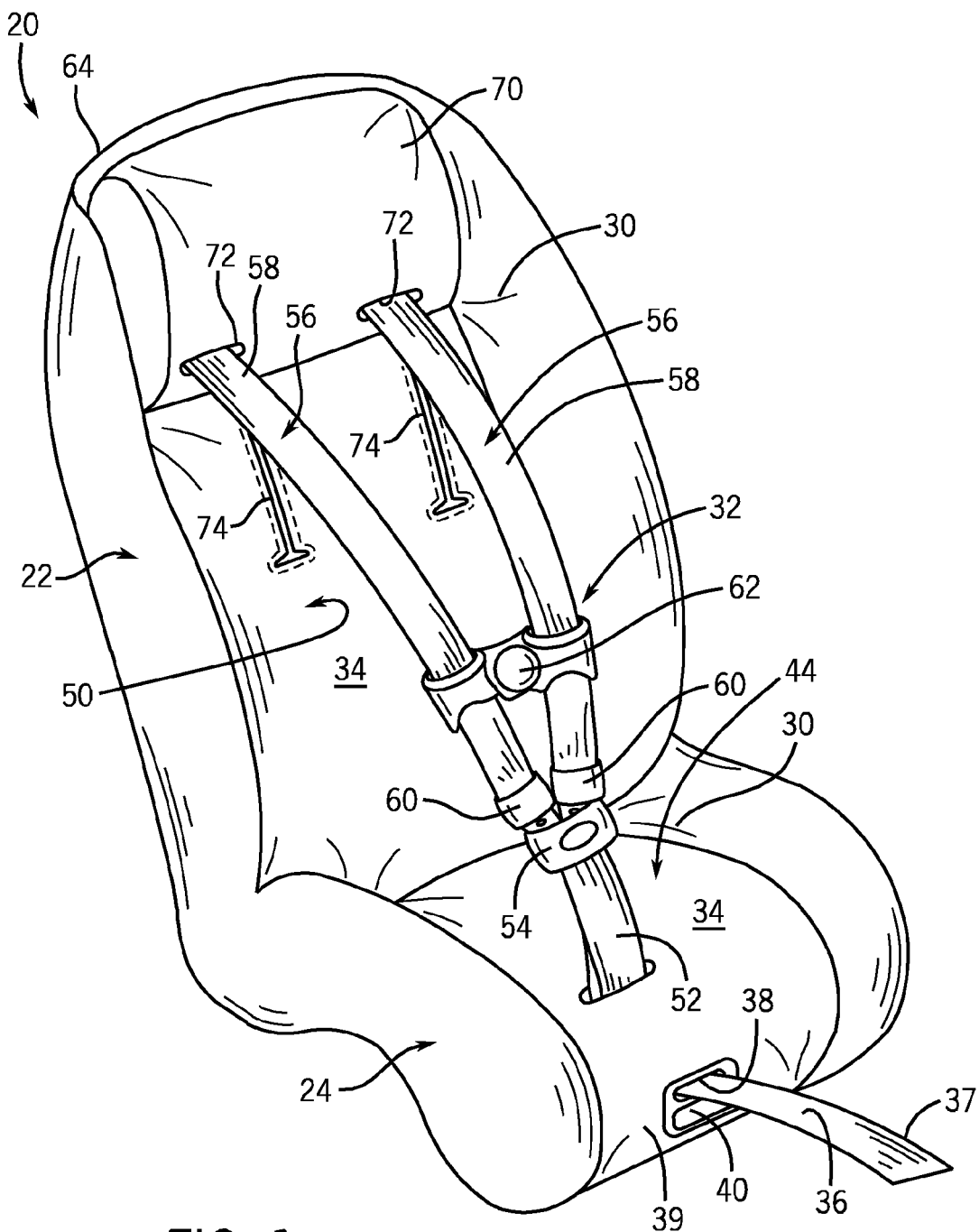
FIG. 1 shows a front perspective view of one example of a car seat constructed in accordance with the teachings of the present invention.
Figure 2:
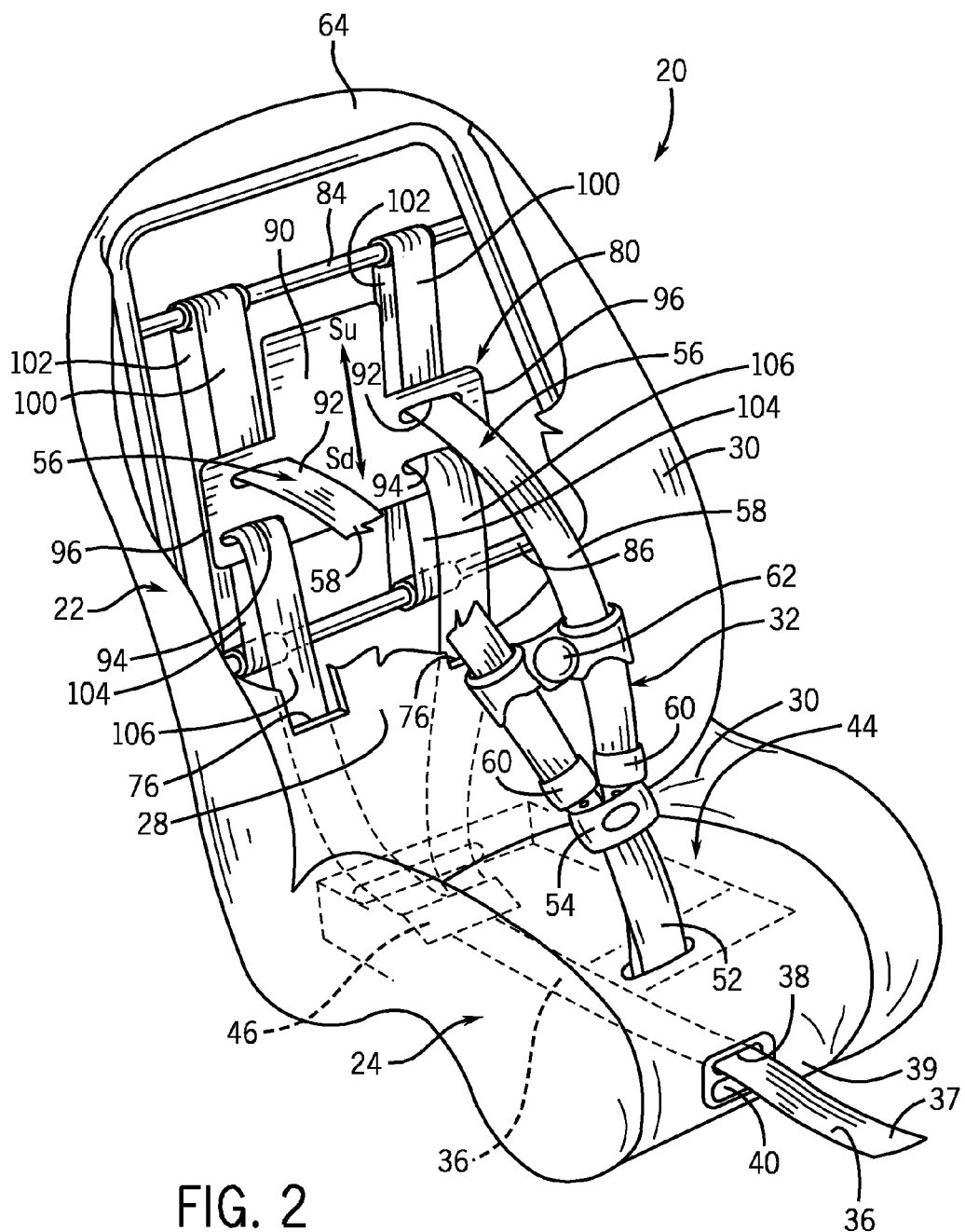
FIG. 2 shows a partial cut away view of the car seat and harness system shown in FIG. 1.
Figure 3:
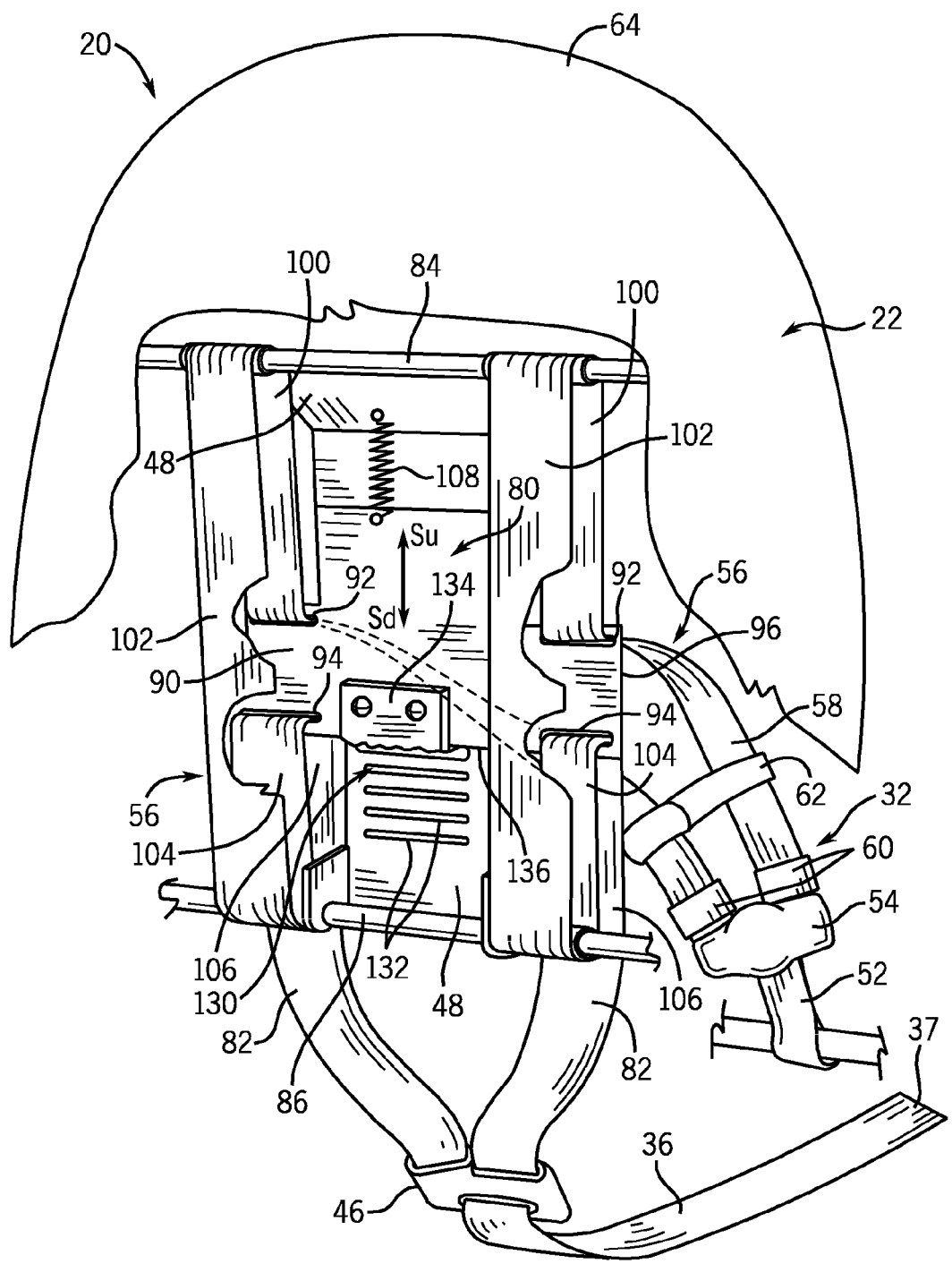
FIG. 3 shows a rear perspective cut-away view of the car seat and harness system shown in FIG. 2.

Turning now to the drawings, FIG. 1 shows one example of a child safety seat or seat assembly 20 constructed in accordance with the teachings of the present invention. In the disclosed example, the seat assembly 20 generally has a seat back 22 and a seat bottom 24. As shown in FIGS. 2 and 3, the seat back 22 and seat bottom 24 can be provided as part of a unitary or contiguous seat shell 28, which may be formed of a molded plastic. The seat shell 28 is then typically covered with soft goods 30 to provide a padded seating surface for the occupant and to create a pleasing aesthetic appearance for the product. The typical seat assembly also has a variety of other features and components for structural rigidity, safety, performance, convenience, and the like. These aspects of the seat assembly 20 are not pertinent to the invention and are not discussed herein. Thus, the drawings provided herewith show a somewhat generic child safety seat or car seat.

With reference to FIGS. 1-3, the seat assembly 20 has an on-board or dedicated safety harness system 32. Exposed portions of the harness system 32 are presented for use over a seating surface 34 defined by the seat back 22 and seat bottom 24. The exposed portions of the harness system are configured to secure a seat occupant in the seat assembly 20 as is known in the art. The harness system 32 in this example generally has an adjustment strap 36 with a free end 37 protruding forward through an aperture 38 in a forward end 39 of the seat bottom 24. The adjustment strap 36 is releasably held or clamped in place at the aperture 38 by a conventional strap clamping device 41 (shown only generically herein). The strap 36 can be released by depressing a release button 40 adjacent the aperture 38, as is known in the art. In the disclosed example, the adjustment strap 36 extends along and beneath an underside 42 of the seat bottom 24. A top side 44 of the seat bottom 24 defines a bottom portion of the seating surface 34. Also in this example, the adjustment strap 36 extends rearward until terminating at a splitter plate 46 to which it is coupled. The splitter plate 46 can be located either beneath the underside 42 of the seat bottom 24, behind a back side 48 of the seat back 22, or in a seat bight region (as shown) therebetween. The back side 48 is opposite a forward facing side 50 of the seat back 22. The forward facing side 50 defines a back portion of the seating surface 34 on the seat assembly 20.

The harness system 32 in this example has a crotch strap 52 connected to and extending up from the seat bottom 22 as is known in the art. A buckle housing 54 is carried on the distal end of the crotch strap 52. Though not shown or described in any detail herein, the harness system 32 can include a pair of lap belts or lap straps that extend upward and forward from opposed sides of the seating surface 34. The lap belts can connect to the buckle housing 54 as part of a well known five-point harness configuration. Such lap belts or straps are not shown herein merely to simplify the images for ease of description of the invention. The harness system 32 also includes a pair of safety straps 56. Each safety strap 56 has a shoulder strap portion 58 that extends forward and downward relative to the back portion of the seating surface 34. Lower ends of the shoulder strap portions 58 terminate at and are coupled to buckle connectors 60 in this example. The connectors 60 are configured to releasably engage the buckle housing 54 as is known in the art. In a common example (not shown herein), the lap belts can be an integral continuation of the shoulder strap portions 58 threaded through slots in the connectors 60. The shoulder strap portions 58 are configured to go over the shoulder and chest of a seat occupant. The shoulder strap portions 58 can also each carry a section of a releasable chest clip 62, commonly used to control the spacing of the shoulder strap portions 58 during use.

The seat assembly 20 also has an optional headrest 70 on an upper end 64 of the seat back 22 that, in one example, is vertically adjustable. The safety straps 56 can extend through strap slots 72 formed near a lower edge of the headrest 70. In this manner, the position of the headrest 70 and safety straps 56, and particularly the height thereof, can be controlled and manipulated in concert with one another. The soft goods 30 and the seat back 22 of the seat shell 28 can be formed having respective vertical slots 74, 76 (shown generically in FIGS. 1 and 2). The slots 74, 76 are provided to allow vertical sliding movement and adjustment of the harness system safety straps 56 and, optionally, the headrest 70, along the shell 28 in accordance with the teachings of the present invention. The soft goods 30 can be configured in numerous different ways, not discussed herein, to allow the straps 58 to pass through the soft goods materials and yet hide or mask the slots 76 in the shell 28, while still allowing vertical adjustment of the straps.

FIGS. 2 and 3 show various components of the disclosed safety harness system 32. In the disclosed example, the harness system 32 has a router 80 or routing components configured to guide the safety straps 56 along a predetermined belt path in accordance with the teachings of the invention. Each of the safety straps 56 has an excess portion or back portion 82 that is a rearward continuation of the corresponding shoulder strap portion 58. As described herein, the shoulder strap portion 58 of each safety strap 56 is the part extending to the forward facing side 50 of the seat back 22. The excess portion 82 of each safety strap 56 is that portion extending behind and to the back side 48 of the seat back 22.

The router 80 and the routing of the excess portions 82 of the safety straps 56 are discussed first with reference to FIGS. 2 and 3. The router 80 generally has an upper guide 84 fixedly secured to the back side 48 of the seat back 22. The router also has a lower guide 86 that is also fixedly secured to the back side 48 in a position spaced below the upper guide 84. In this example, the upper and lower guides 84, 86 are each provided as a horizontal bar or rod mounted on the seat back 22. However, the upper and lower guides can differ from the example shown and yet function as intended to route portions of the safety straps 56. Also, the means by which the guides or rods are secured to the back side 48 on the seat back 22 can also vary considerably.

The router 80 also includes a slider 90 positioned vertically between the upper and lower guides 84, 86. The slider 90 in this example has a plurality of slots including a pair of upper slots 92 and a pair of lower slots 94. Each pair of slots 92, 94 is laterally spaced apart on opposite sides of the slider 90 in this example. The lateral slot spacing defines spacing of the safety straps 56, and particularly the shoulder strap portions 58. The spacing of the pass through slots 76 in the shell 28 should match and laterally coincide with the spacing of the slots 92, 94 in the slider 90.

The configuration and construction of the slider portion of the router 80 can also vary with the spirit and scope of the present invention. In this example, the slider 90 is generally a wide flat plate. However, the slider 90 can have contours and a perimeter shape that are significantly different from the simplistic example shown and described herein. The slider 90 can have side edges 96 that are received or captured in guides or tracks (not shown) formed in the back side 48 on the seat back 22. Such tracks could help guide the slider 90 along a predetermined or desired path along the seat back 22. Alternatively, the slider 90 could be sandwiched within or between layers of the seat assembly or seat shell, if desired.

With reference to FIGS. 2-5, the excess portions 82 of the safety straps 56 are defined in segments in order to describe the routing or belt path of the straps created by the router 80. Each of the straps 56 has essentially the same segments and thus only the routing for one of the straps is described in detail herein. The routing of the other strap is essentially identical to the one described below in this example.

The shoulder strap portion 58 of the safety strap 56 extends rearward, first through the strap slots 72 in the headrest 70.

The strap portion 58 then passes through the slot 74 in the soft goods and the pass through slot 76 in the seat shell 28. On the back side 48 of the seat back 22, the shoulder strap portion 58 then is identified as the excess strap portion 82 as described herein.

The excess portion 82 passes through a corresponding upper slot 92 in the slider 90. An upper segment 100 of the excess portion 82 extends upward and is defined between the upper slot 92 in the slider 90 and the upper guide 84. The excess portion 82 of the safety strap 56 is then routed over, around, and down from the upper guide 86 forming an intermediate segment 102. The segment 102 extends vertically downward from the upper guide 84 to the lower guide 86. The excess portion 82 of the safety strap 56 is then routed under and around the lower guide 86 and then back up from the lower guide 86 to form a lower segment 104. The lower segment of the excess portion 82 passes through a corresponding lower slot 94 in the slider 90 and then is routed back downward adjacent the back side 48 of the seat back 22. This segment of the excess portion 82 is defined herein as the tensioning segment 106. The terminal end of the tensioning segment 106 is joined with or coupled to a portion of the splitter plate 46. The tensioning segment 106 is oriented generally parallel to a plane of the slider 90 whereas the shoulder strap portion 58 of the safety strap 56 extending forward from the slider is generally normal or perpendicular to the slider.

As represented by the vertical arrows Su (up) or Sd (down) in FIGS. 2 and 3, the slider 90 can move vertically up or down. Moving the slider 90 will alter the positioning of the upper slots 92, as well as the lower slots 94. Adjusting the position of the slider 90 will thus also adjust the vertical position of the safety straps 56 and, particularly, the location along the seat back 22 where the shoulder strap portions 58 protrude from the seat back.

In one example, the position of the slider 90 could be manually adjusted upward in the Su direction by direct access from the back side 48 of the seat back 22 and then by grasping and moving the slider. The slider 90 can be manually adjusted downward in the Sd direction by tugging on the free end 37 of the adjustment strap 36 protruding from the forward end 39 of the seat bottom 24. By tugging on the adjustment strap end 37, the splitter plate 46 and tensioning segments 106 of the excess portions 82 will be drawn downward. This in turn will draw or pull the slider 90 downward.

The clamping device 41 at the aperture 38 is typically a one-way clamp. The device allows the strap 36 to be pulled outward or withdrawn from the forward end 39 of the seat bottom 24, but does not allow the strap to return or retract inward until the release button 40 is actuated. The clamping device 41 can be utilized to maintain a selected shoulder strap height and tension in the harness system 32. If the user wishes to move the height position of the strap portions upward, in one example the user can manually release the clamping device 41 via the button 40 and then grasp and raise the slider 90 in the direction Su. This will pay out additional length of the adjustment strap rearward toward the seat back 22. In another example shown generically in FIG. 3, a biasing element or spring 108 can be coupled between the slider 90 and the seat back 22. The spring can be positioned and configured to bias the slider 90 in the upward Su direction. If the user were to press the release button 40 at the aperture 38, the clamping device 41 would release the adjustment strap 36. The slider 90 would then be free to move upward in the Su direction, and would automatically do so under the spring 108 biasing force. In another example (not shown herein), the headrest 70 can be spring biased upward, which in turn could draw the shoulder strap portions 58 and slider plate 90 upward when tension in the harness system is released.

When a user tugs on the free end 37 of the adjustment strap 36 and obtains a desired harness height position, the user can simply release the strap. The clamping mechanism 41 at the aperture 38 will retain the adjustment strap and thus the harness system 32 under the selected tension. This will result in the slider 90 remaining in the selected height position as well. No other engagement means or latching components are required to retain the slider 90, and thus the shoulder strap height, in the set position. The upper and lower guides 84, 86 are both fixed to the seat back 22 and need not be moved or readjusted in order to alter the harness height. The router 80 as disclosed and described herein and the resultant belt path routing achieve these function. The router 80 retains the selected harness height while still allowing adjustment when needed without having to undo or rethread the harness from the seat shell.

Figure 4:
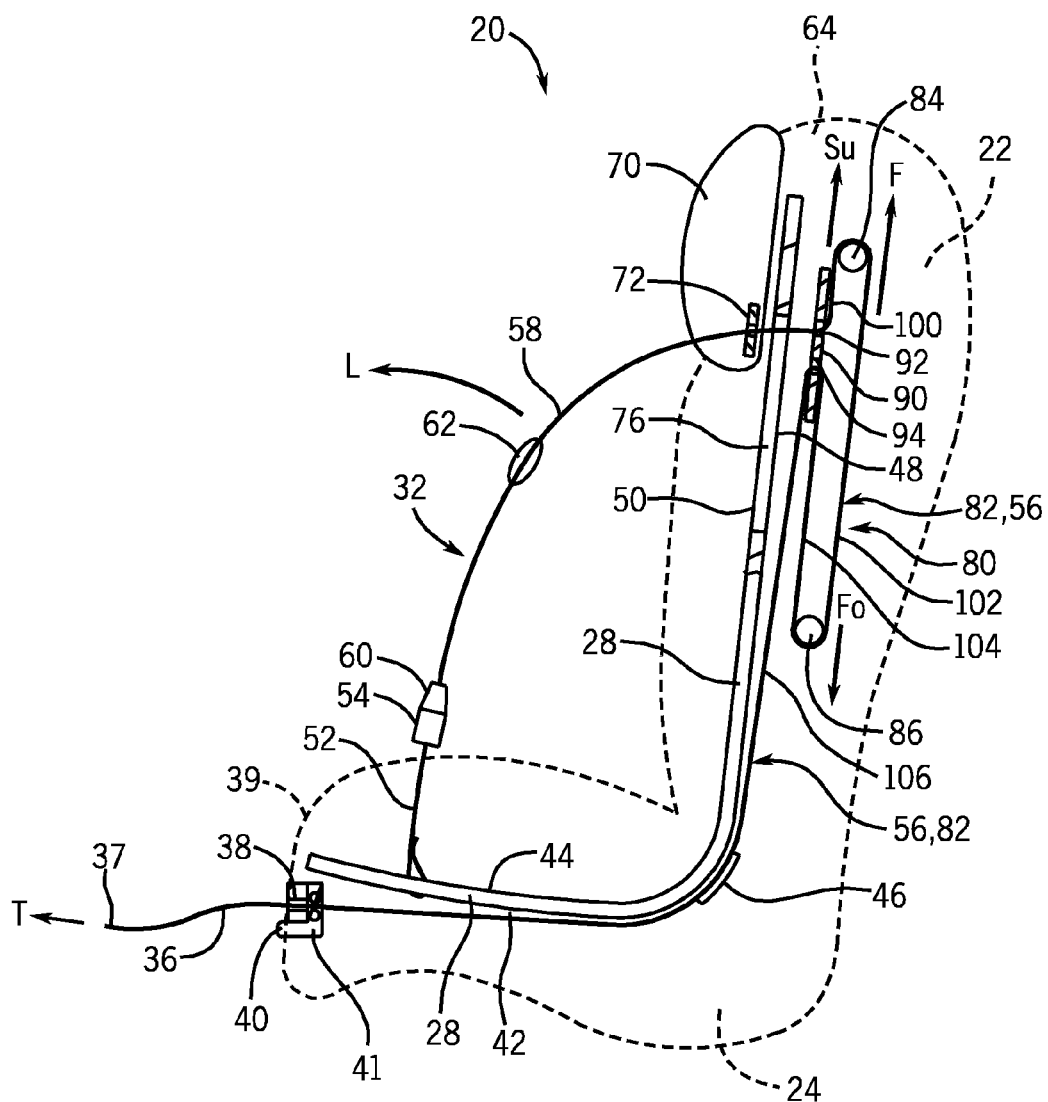
FIG. 4 shows a side schematic view of the car seat shown in FIGS. 1-3 with the shoulder straps of the harness system in a raised position.

With the clamping device 41 at the aperture 38 engaged, a seat occupant may move forward or rise up or a caregiver may tug forward or pull on the shoulder strap portions 58, resulting in an applied force or load L (see FIG. 4). This load L will be transferred through the upper segment 100 and the intermediate segment 102 of the excess portions 82 in the shoulder straps in an upward direction according to the arrow F in FIG. 4. However, an equal and opposite force in the direction of the arrow FO will resist the force F via the lower segment 104 and intermediate segment 102 because the adjustment strap 36 is clamped at the aperture 38 by the clamping mechanism or device 41. Thus, the slider 90 will not move up or down. This is so, even though there are no particular mechanisms or components provided to latch or positively retain the slider in position. Only the conventional harness system straps, crotch belt, and adjuster clamp 41, along with the router 80 and resultant belt path routing, are needed to achieve these results.

The clamping mechanism 41 at the aperture 38 is released by pressing the release button 40. When released, slack can be added or paid out to the adjustment strap 36 by pulling on the shoulder straps 56. A user can manually raise the position of the slider 90 simply by lifting and pulling up on the shoulder strap portions 58 when the adjustment strap 36 is released. As noted above, the slider 90 and/or headrest 70 can be biased by a biasing element, such as the spring 108. If utilized, the spring 108 can automatically return or raise the slider 90 and/or headrest 70 upon release of the adjustment strap 36.

Figure 5:
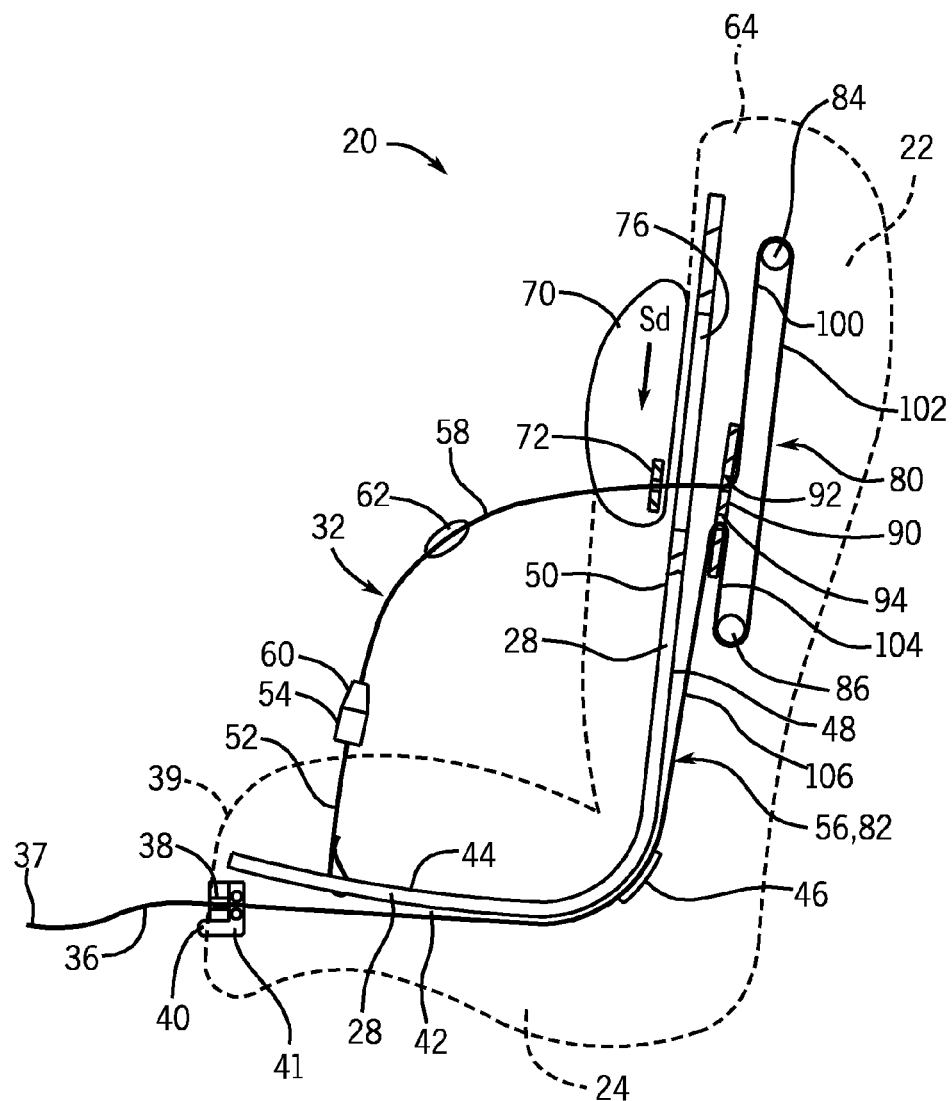
FIG. 5 shows the car seat depicted in FIG. 4 with the shoulder straps in a lowered position.

FIG. 4 shows a side view of the harness system 32 and the seat assembly 20. The shoulder strap portions 58 of the safety straps 56 and the headrest 70 are shown therein in an uppermost or raised position. As noted above, a user can tug in the direction of the arrow T on the free end 37 of the adjustment strap 36, which will apply tension to the harness system 32. This tension will draw the slider 90, and thus the shoulder strap portions 58 of the safety straps 56 downward as described above. The adjustment strap 36 can be released or dropped when the appropriate tension and/or desired harness height of the shoulder strap portions 58 s is achieved. In the disclosed example, the headrest 70 is connected to the shoulder straps 56 through the strap slots 72. Thus, the headrest 70 will also be adjusted downward to a suitable position to accommodate a smaller occupant. FIG. 5 shows a side view of the harness system and seat assembly 20 with the shoulder strap portions 58 and the headrest 70 in a lower most or lowered height position.

Figure 6:
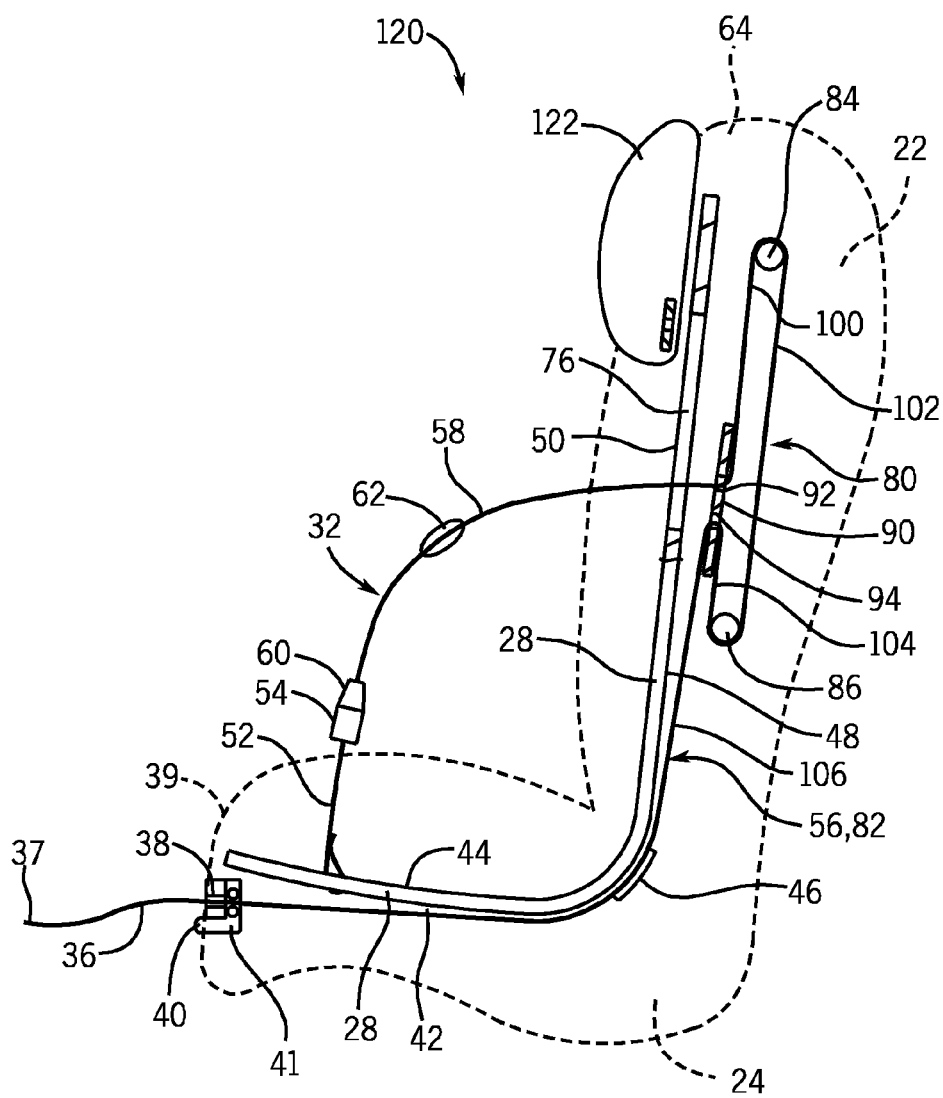
FIG. 6 shows an alternate example of a car seat similar to the car seat depicted in FIGS. 4 and 5.

FIG. 6 illustrates an alternative example of a seat assembly 120 that is essentially identical in construction to the seat assembly 20 described above. However, in this example the headrest 122 is not connected to any part of the harness system 32. The headrest can be provided in a fixed position or can be constructed so that it is manually adjustable to different vertical positions separate from any adjustment of the harness system or shoulder straps 56. Many car seats employ specific headrest release actuators and biasing mechanisms for manual, independent adjustment of the headrest. Such actuators and mechanisms could be employed on the seat assembly 120 if desired.

FIG. 3 illustrates another optional feature that can be employed on the car seat of the invention. A tactile and/or audible feedback device 130 can be employed on the seat assembly 20. The device 130 can be configured to provide tactile and/or audible feedback to a user when the slider 90 is raised or lowered. In one example, the slider 90 or seat back 22 can include a resilient or biased element and the other of the two components can include a plurality of raised ribs, detents, depressions, recesses, nubs, bumps, or the like. As shown in FIG. 3, the seat back 22 in this example has a plurality of elongate, horizontal depressions 132 spaced vertically along the back side 48. The depressions 132 can be positioned to denote the maximum raised position in FIG. 4, the minimum lowered position in FIG. 5, and a plurality of intermediate positions between the raised and lowered positions. A flexible tab 134 is coupled to the bottom edge 136 of the slider 90 in this example. The tab 134 has a portion that can align with and seat in the depressions 132 when aligned with any one of them. The tab 134 is resilient and flexible and biased toward the back side 48 in order to seat in one of the depressions.

As the slider 90 moves or is moved up (Su) or down (Sd) during adjustment, the tab 134 will slide along the array of depressions 132 and bend as it passes each depression. This will create a tactile and audible "click" or "snap" as the slider is moved, which can indicate to a user that the slider is moving, i.e., that adjustment is under way. The tab 134 can also seat in any one of the depressions 132, which can define or help define a plurality of finite positions for the slider along the seat back 48, if desired. The tactile and audible features can also be provided to help retain the slider 90 in a particular position until the harness system is released or readjusted.

In the disclosed seat assembly, the desired shoulder strap height can be maintained without having to employ an elaborate or complex latching system. Instead, the routing of the safety strap excess portions 82 created by the router 80 maintains the desired adjusted height of the shoulder straps. When the harness system is adjusted and clamped at the aperture 38 by the clamping device 41, the forces applied to the shoulder strap portions result in equal and opposite forces being applied by the router 80 and the routing of the straps. When the clamping device 41 is released or disengaged at the aperture 38, the design of the router 80 allows for easy and simple harness height adjustment without having to rethread or undo any portion of the harness system from the shell or seat assembly.

Although certain car seat assemblies, harness systems, harness routing, and router features have been described herein in accordance with the teachings of the present disclosure, the scope of coverage of this patent is not limited thereto. On the contrary, this patent covers all embodiments of the teachings of the disclosure that fairly fall within the scope of permissible equivalents.

What is claimed is:

1. A child safety seat comprising:
    a seat back having an upper end, a back side, and a front facing side;
    a seat bottom having a forward end, a top side, and an underside;

a harness system having
a pair of safety straps each with a shoulder strap portion extending forward and downward along the front facing side and an excess portion extending rearward from the shoulder strap portion behind the back side; and
an adjustment strap coupled to the excess portions of the safety straps and extending from the back side to the forward end; and
a router on the back side having an upper guide, a lower guide, and a slider movably positioned vertically between the upper and lower guides,
wherein the excess portions are routed from the shoulder strap portions through the slider, up to and over the upper guide, down to and under the lower guide, back up to and through the slider, and down to the adjustment strap, and
wherein the height of the shoulder strap portions along the front facing side is adjustable and determined by a vertical position of the slider.

2. A child safety seat according to claim 1, further comprising a splitter plate connected between the excess portions of the safety straps and the adjustment strap.

3. A child safety seat according to claim 1, wherein the adjustment strap extends along the back side and along the underside of the seat bottom and has a free end extending from an aperture in the forward end.

4. A child safety seat according to claim 1, wherein the height of the shoulder strap portions can be adjusted from a raised position downward by increasing tension on the adjustment strap thereby lowering the slider.

5. A child safety seat according to claim 1, further comprising a headrest coupled to the seat back near the upper end, the position of the headrest being vertically adjustable in concert with the shoulder strap portions, wherein the shoulder strap portions are threaded through part of the headrest and through the seat back whereby vertical movement of the slider also moves the shoulder strap portions and the headrest.

6. A child safety seat according to claim 1, wherein the upper and lower guides are elongate bars fixed to the back side of the seat back.

7. A child safety seat according to claim 1, wherein the slider is a plate with upper slots and lower slots.

8. A child safety seat according to claim 1, wherein the excess portions of the safety straps each have an upper segment between the slider and the upper guide, an intermediate segment between the upper and lower guides, and a lower segment between the lower guide and the slider.

9. A child safety seat according to claim 1, wherein the adjustment strap can be clamped and restrained from being adjusted, whereby pulling forward on the shoulder strap portions does not raise or lower the slider or the height of the shoulder strap portions.

10. A child safety seat comprising:
a seat back having an upper end, a back side, a front facing side, and two vertically elongate pass through slots formed through the seat back;
a harness system having a pair of safety straps each with a back portion on the back side, a shoulder strap portion on the front facing side, and threaded through a respective one of the pass through slots;
a router on the back side having a fixed upper guide, a fixed lower guide spaced below the upper guide, and a slider vertically movable therebetween,
wherein the back portions are routed from the respective shoulder strap portions through the slider, up to the upper guide, down to the lower guide, and back up to the slider,
wherein the slider is vertically adjustable between a raised position and a lowered position and determines the height of the shoulder strap portions.

11. A child safety seat according to claim 10, further comprising an adjustment strap connected to the safety straps below the slider, the adjustment strap having a free end that can be pulled to adjust the slider and shoulder strap portions from the raised position toward the lowered position.

12. A child safety seat according to claim 11, further comprising:
a seat bottom having an underside, the adjustment strap routed beneath the underside with the free end protruding through an aperture in a forward end of the seat bottom; and
a clamping mechanism located at the aperture to releasably clamp the adjustment strap.

13. A child safety seat according to claim 10, further comprising a headrest coupled to the seat back near the upper end, the shoulder strap portions threaded through part of the headrest whereby a height of the headrest is adjustable in concert with the slider and shoulder strap portions.

14. A child safety seat according to claim 10, further comprising a biasing element coupled to the slider and biasing the slider toward the raised position.

15. A child safety seat according to claim 10, wherein the upper and lower guides are elongate rods fixed to the back side of the seat back.

16. A child safety seat according to claim 10, further comprising:
a seat bottom having an underside and a forward end;
an adjustment strap coupled to the back portions of the safety straps, routed beneath the underside, and having a free end protruding from the forward end;
a crotch strap extending up from the seat bottom, the shoulder strap portions connectable to the crotch strap; and
a clamping mechanism located at the forward end to releasably clamp the adjustment strap.

17. A child safety seat according to claim 16, wherein the free end can be pulled outward from the forward end to adjust the height of the slider and shoulder strap portions from the raised position toward the lowered position.

18. A child safety seat according to claim 16, further comprising a biasing element coupled to the slider and biasing the slider and should strap portions toward the raised position.

19. A child safety seat according to claim 10, further comprising a device to create a tactile or audible feedback as the slider is moved between the raised and lowered positions.

* * * * *